United States Patent Office 3,330,611
Patented July 11, 1967

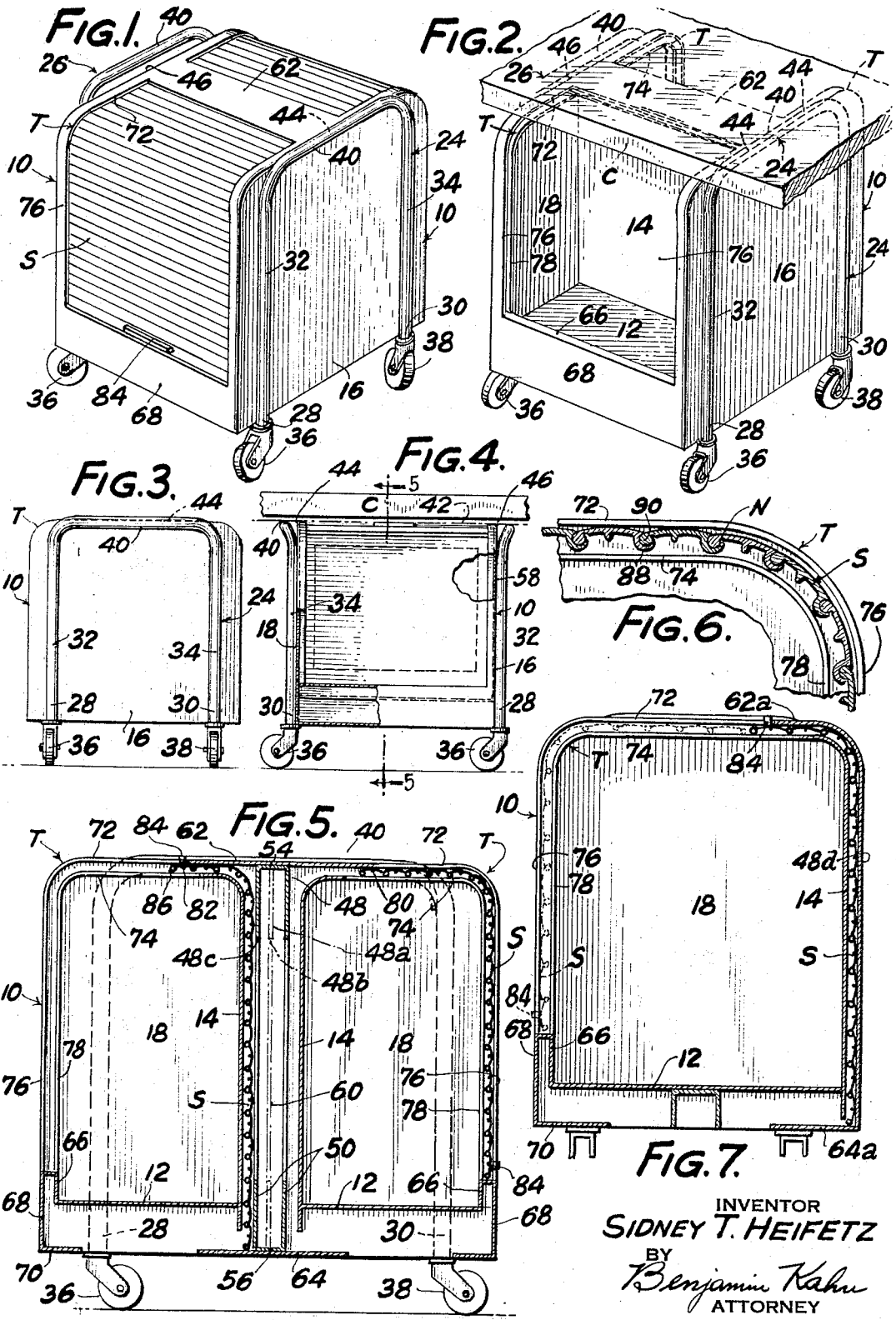

3,330,611
MOBILE BULK-STORAGE COMPARTMENT CARTS
Sidney T. Heifetz, 1430 Parkchester Road, Bronx, N.Y. 10462
Filed Aug. 16, 1965, Ser. No. 479,770
2 Claims. (Cl. 312—297)

This invention relates to mobile bulk-storage compartment carts of the coverable open side and open top variety adapted for use in both the open and closed condition of the compartment.

More particularly this invention relates to such mobile utility compartment containers in the form of floor carts for readily receiving, retaining in open condition and transporting in closed condition, a maximum of material in a highly efficient, compact and speedy manner.

Still more particularly the invention relates to manually operable bulk or stacked storage utility compartment carts as are used in food establishments for servicing, storing to maximum internal capacity, bussing and transporting a maximum of food, foodware, dishware and like articles in an easy and highly sanitary manner.

In general and in certain objective particulars the invention relates to the type and character of carts and carriers for dishware and like articles as shown and described in Patent Number 2,835,546 issued to H. H. Rothschild May 20, 1958.

A principal object of the invention is the provision of a cart of the character above mentioned having high adaptability for efficient maximum loading while lodged in highly confined quarters of difficult accessibility from the top, such as under a counter.

One of the main objects of the invention is the provision of a cart of the above character with substantially cubical shaped storage compartments or compartment having substantially full top and substantially full side or front access to the interior of said compartment and having continuous curtain type covering for said right angularly disposed access openings or surfaces.

Another object of the invention is the provision of an efficient design and construction of such mentioned carts forming a right angular compartment structure of high capacity and cover of simple, sturdy and novel members and means facilitating easy fabrication, assembly and use, and whereby, the overall cost is low.

Other objects and advantages will be pointed out in connection with certain preferred forms of the invention illustrated in the accompanying drawing, and still others will appear in the following detailed description and specification covering the principles of the invention as specifically claimed.

In the drawings:

FIG. 1 is a perspective view of one form of the invention with its covers in closed compartment condition.

FIG. 2 is a similar view of the same form with its covers in open compartment condition, and disposed under a counter.

FIG. 3 is an end view of the form shown in FIGS. 1 and 2.

FIG. 4 is a front view with some of the foreground parts broken away for purposes of clarity.

FIG. 5 is a sectional view along the lines 5—5 of FIG. 4, showing one of the compartments covered and the other open.

FIG. 6 is an enlarged detail section of the curtain and a portion of the trackway at the front and rear top corners.

FIG. 7 is a sectional view similar to FIG. 5 but of another form of the invention having only one compartment.

According to the invention, a body generally indicated as 10, is composed of sheet metal formed to provide a bottom wall 12, a rear wall 14, and end substantially oblong walls 16 and 18 having substantially sharp yet rounded front top corners of substantially minimum radius. All of these walls are integrally joined at their common edges as by means of bends or welds at the common junctures of their abutting surfaces or walls. Other known methods and means of joining adjacent corner-abutting surfaces or walls may be employed, as by brazing, riveting or lap welding of overlapping marginal portions along the mentioned common edges of such adjacent walls or surfaces. Still other means and methods of fabricating, forming and moulding container body shapes of the character shown are well known in the art of sheet metal and plastic sheet fabrication. Any of these means or methods may be advantageously employed in the production of a substantially maximum capacity body shape of the character illustrated. The forms shown in the drawing are of butt weld or fillet-weld, "sheet-metal-bending" type of construction.

Attached as by means of welding or the like to the outer surfaces of the substantially oblong end walls are a pair of mutually opposed tubular members generally designated as 24 and 26. These tubular members are disposed substantially centrally of the oblong end walls and are of inverted U shape, their horizontal portions 40 being bent out and away from the outer surfaces of the end walls along the top thereof. At the bottoms of the free ends of the legs 32 and 34 of the U shaped tubular members as at 28 and 30 there are provided casters 36 and 38 substantially near the bottom corners of the casing body. These casters are preferably of the swivel type thus making the device readily mobile but in some applications, particularly indoors, sliding button type gliders may be efficiently used in preference to the mentioned swivel type roller casters.

The horizontal upper portions 40 of the U-shaped tubular members 26 and 27 are, as seen in FIGS. 1, 2 and 4, equally spaced from the upper corners and away from the upper corner edges 44 and 46 of the ends walls 16 and 18. The latter spacing being at a distance sufficient to provide finger and palm clearance for grasping when it is desired to shift the location of the device, turn it around or to manually transport it to another locale. The top of these horizontal hand rails 40 extend substantially no higher than to the dot-and-dash line 42, which is its uppermost extent, immediately below the clearance level of the counter C as seen in FIG. 4. With these depth, height and width aspects and related constructions incorporated for a given counter height, a maximum capacity container is obtained.

In the preferred forms of the invention illustrated, a single compartment model is shown in FIG. 7 having accessibility substantially along its entire horizontal top and substantially along its entire contiguously adjacent vertical face, while the model of the form shown in FIGS. 1 to 5, illustrates a dual compartment modification also of substantially maximum capacity wherein a central partition separates the independent, substantially maximum capacity compartments of rectangular conformation and of substantially oblong section, as that of FIG. 7, and also provides substantially high capacity and extensive accessibility along the tops of both compartments. At a station, except under a counter where accessibility only along the front is available for loading and unloading the compartment is had, at a station in the clear it is readily seen as desirable to provide a high frontal surface of maximum scope and of accessibility substantially up to the tops of the compartments. However, under a shallow counter the form of FIG. 7 in the shown proportions has been found satisfactory. For use under wider counters this single compartmented form has been found to be too deep diagonally and the dual compartmented form was found preferable. However, in single or double compartmented structures, it is desirable to make the horizontal and vertical openings as large as possible with their corner juncture radius as small as is feasibly possible, inasmuch as a radius corner encroaches upon the internal capacity of the compartment or compartments.

Referring now to the dual compartmented form of the invention shown in FIGS. 1 to 5, and particularly to FIG. 5, the body 10 is provided with a partitioning member generally indicated as 48 attached to the end walls 16 and 18 substantially midway thereof, thus dividing the device into two substantially equal, substantially rectangular compartments of substantially maximum capacity. This partitioning may be of channel cross-section comprising inwardly directed leg elements 50 joined by a frame-like web element 52 extending between the end walls 16 and 18 as at 54 and 56 respectively, along the top and bottom, and vertically along the end walls as at 58 and 60. The partitioning member may take the form of a single planed sheet metal frame indicated in dot-and-dash lines as at 48a with an opening 48b therein similar to the opening 48c in the channel-like frame member 48.

These frame members 48 or 48a as the case may be, are attached along their top and bottom to horizontally disposed top and bottom plates 62 and 64 respectively, which in turn are attached to the end walls 16 and 18 midway along their respective tops and bottoms as by means of butt or lap welding or the like. This construction provides a double legged T section between compartments along the top and bottom in the case of the channel partitioning frame member 48, or a single legged T section in the case of the employment of the sheet metal frame member 48a. In any event, such construction provides a juncture between the end walls 16 and 18 of high sectional modulus thus providing relative lightness and high rigidity to the structure as a whole. In the single compartment form illustrated in FIG. 7, in lieu of the frame members 48 or 48a, a solid plate sheet-metal wall 48d is attached to its end wall 16 and 18. This wall 48d is provided with horizontally disposed top and bottom portions 62a and 64a which are counterparts to the plates 62 and 64 respectively of the dual compartmented form of the invention.

The rear wall 14 is spaced from th elements 48, 48a and 48d to permit the reception and passage of a flexible curtain C, the details of construction of which, and its function will be more fully described hereinafter. The bottom wall 12 is spaced up from the virtual bottom of the body of the cart and from the bottom plates 64 and 64a and extends forward to form a front curb moulding 66 which together with an apron facia portion 68 and a return bottom bend piece 70, all attached to the end walls, forms a substantially strong and box-rigid compartment structure, open substantially along the entire front and open substantially along the entire top thereof.

Along the upper open edges and along the sides and front edges of the end walls comprising each compartment the openings at such marginal edges are bounded by a trackway generally designated T which are composed of inwardly directed spaced flanges 72 and 74 running horizontally along the top and the pair of continuing spaced flanges of like character running vertically along the side or front opening between the end walls, as at 76 and 78. These flanges are integral with or are welded or otherwise integrally joined or attached to the respective end walls and are adapted to project inwardly sufficiently to straddle the edges of the flexible curtain operatively trained in and between the mutually opposed and oppositely disposed trackways. The proportions of the dual compartment device is such that in the closed position of the curtain of prescribed length, as seen on the right hand compartment of FIG. 5, the tail end of the curtain lies just under the forward edge of the top plate 62 as at 80 when the forward edge of the curtain rests upon the right hand curb 66. In the open position of the curtain as seen on the left hand compartment of FIG. 5, the forward edge of the curtain as at 82 projects from under the forward edge of the top plate 62, the major portion of the curtain adapted to hangingly lie in the space between the members 48 or 48a as the case may be, and the back wall 14. This hanging circumstance coming about by virtue of a cleat 84 attached to the forward rod 86 of the curtain, and its contact with the said forward edge of the top plate 62. With the preponderance of the rods of the curtain in the open position being disposed in the hanging mode, a fully open curtain tends to stay open. Similarly in the closed position of the curtain, most of the rods comprising the flexible curtain are in the vertical portion of the trackway and therefore a closed curtain tends by gravity to stay closed. It is therefore seen that upon manual manipulation of the cover from one position, and toward the end of the other position, automatically, a favorable counterbalance comes into effect, which urges the completion of the trans-position, as manually initiated.

As seen in FIG. 6, the flexible curtain is composed of a plurality of rods captively engaged in pivotal link fashion by the engagement of their adjacent longitudinal edges, these rods are of like transverse section, each being provided with a longitudinal socket 88 of slightly more than 180 degrees of embracement scope along one edge and a cylindrical portion 90 along its other longitudinal edge and adapted to fit within the socket of an adjacent rod, thus making up a curtain of prescribed length that is capable of being pushed around the corner of the trackway of a comparatively small radius depending upon the limitations of the thickness or thinness of the necks N of the curtain rod elements.

From the foregoing description it can readily be seen that stationed under a counter, a maximum height cart of maximum capacity can be had, and its cover can be opened and closed without having to remove the cart from under the counter; that in the open position of the cover a high degree of accessibility to the interior of the compartment is attained; that in the closed condition of the compartment, the cover stays closed and presents a neat exterior; that the device can be readily moved in and out of close quarters and can be easily manipulated in transport: and that the constructions are simple and sturdy.

Having thus described my invention in connection with the illustrated forms it is understood that these are typical embodiments of the principles involved and other modifications and variations may be had without departing from these principles as claimed.

I claim:

1. A mobile storage cart of the character described comprising spaced-apart wheeled hand-frame means, a casing positioned between said frame means and having side walls secured to the latter, said casing providing a compartment of substantially rectangular block conformation, said casing having an inner rear wall and an outer rear wall spaced from said inner rear wall, and a bottom wall, all of said walls being fixed to said side walls thereby forming said compartment having a substantially fully open flat top surface and a substantially fully open flat front surface, a flexible slidable cover means adapted to cover and uncover the said top and front surfaces, said space between said inner and outer rear walls adapted to form a guideway for said cover means in said uncovered position of said top and front surfaces, and a rightangular trackway for said cover means in each of said side walls to retain said cover means in said covering position thereof, said trackways having a minimal radius at the junctured corners in the side walls of the top and front surfaces of the compartment openings, whereby a maximum rectangular block internal capacity of the compartment is obtained.

2. A mobile storage cart of the character described comprising spaced-apart wheeled hand-frame means, a casing positioned between said frame means and having side walls secured to the latter, said casing being provided with two compartments, each compartment being of substantially rectangular block conformation, each compartment having a fixed rear wall and a fixed bottom wall, said rear walls of said compartments being spaced from each other and interconnected with each other along their vertical side edges to said opposing side walls to thereby form a hollow wall space between said rear walls, each compartment being further provided with a coverable substantially fully open top and a convertible substantially full open front, a flexible slide cover means to cover and uncover the said top and front of each of said compartments, respectively, a stiffening wall member fixed to said side walls and disposed in said hollow wall space and spaced from said fixed rear walls of said compartments to form a guideway for said cover means in said uncovered position thereof, and a right-angular trackway for said cover means in each of said side walls to retain said cover means in said covering position thereof, said trackways having a minimal radius at the juncture corners in the side walls at the top and front surfaces of the compartment openings, whereby substantially maximum rectangular block internal capacity of the compartments is obtained.

References Cited
UNITED STATES PATENTS

| | | | |
|---|---|---|---|
| 422,707 | 3/1890 | Bockel et al. | 160—229 |
| 769,287 | 9/1904 | Abrahams | 312—297 X |
| 2,722,469 | 11/1955 | Kosovsky | 312—297 X |

FOREIGN PATENTS

| | | |
|---|---|---|
| 1,076,029 | 4/1954 | France. |

CHANCELLOR E. HARRIS, *Primary Examiner.*

FRANK DOMOTOR, *Assistant Examiner.*